United States Patent
Bai et al.

(10) Patent No.: US 11,007,456 B2
(45) Date of Patent: May 18, 2021

(54) SHORT-PROCESS SEPARATION SYSTEM FOR SEPARATING IONIC LIQUID FROM ALKYLATION REACTION EFFLUENT

(71) Applicant: East China University of Science and Technology, Shanghai (CN)

(72) Inventors: Zhishan Bai, Shanghai (CN); Zhaojin Lu, Shanghai (CN)

(73) Assignee: East China University of Science and Technology, Shanghai (CN)

(*) Notice: Subject to any disclaimer, the term of this patent is extended or adjusted under 35 U.S.C. 154(b) by 34 days.

(21) Appl. No.: 16/657,012

(22) Filed: Oct. 18, 2019

(65) Prior Publication Data

US 2020/0398189 A1 Dec. 24, 2020

(30) Foreign Application Priority Data

Jun. 19, 2019 (CN) .......................... 201910531603.7

(51) Int. Cl.
*B01D 17/04* (2006.01)
*C10G 33/04* (2006.01)
(Continued)

(52) U.S. Cl.
CPC ............ *B01D 17/045* (2013.01); *B01J 14/00* (2013.01); *B01J 35/12* (2013.01); *B01J 38/48* (2013.01);
(Continued)

(58) Field of Classification Search
None
See application file for complete search history.

(56) References Cited

U.S. PATENT DOCUMENTS

| 2010/0130800 A1* | 5/2010 | Luo ...................... B01D 17/045 |
| | | 585/446 |
| 2013/0066133 A1* | 3/2013 | Cleverdon ................ C07C 2/58 |
| | | 585/721 |
| 2018/0056212 A1* | 3/2018 | Luo ..................... B01D 17/0214 |

FOREIGN PATENT DOCUMENTS

| CN | 102271777 A | 12/2011 |
| CN | 108368005 A | 8/2018 |

(Continued)

OTHER PUBLICATIONS

Corresponding Chinese Search for Application No. 201910531603.7 with search date Nov. 5, 2020.

*Primary Examiner* — Philip Y Louie
(74) *Attorney, Agent, or Firm* — Dinsmore & Shohl LLP

(57) ABSTRACT

The disclosure provides a short-process separation system for separating ionic liquid from alkylation reaction effluent, comprising an alkylation reactor, an ionic liquid storage tank, a primary coalescence separator, a secondary coalescence separator, a flash tank, a low-temperature fine coalescence separator and a fractionating tower that are linked in order. The inlet of the ionic liquid storage tank communicates with the bottom flow ports of the primary coalescence separator, the secondary coalescence separator and the low-temperature fine coalescence separator through delivery lines, and the outlet of the ionic liquid storage tank communicates with the return port of the alkylation reactor through a delivery pump. The alkylated oil collected from this system has a high degree of cleanliness, and can be used directly as a component for formulating clean gasoline. The ionic liquid catalyst collected therefrom may be directly returned to the alkylation reactor for cycle use.

16 Claims, 3 Drawing Sheets

(51) Int. Cl.
*C10G 29/20* (2006.01)
*B01J 14/00* (2006.01)
*B01J 35/12* (2006.01)
*B01J 38/48* (2006.01)
*C10G 50/00* (2006.01)

(52) U.S. Cl.
CPC ............ *C10G 33/04* (2013.01); *C10G 50/00* (2013.01); *B01J 2219/00047* (2013.01); *B01J 2219/00923* (2013.01); *C10G 2300/1092* (2013.01); *C10G 2300/4081* (2013.01); *C10G 2300/701* (2013.01); *C10G 2400/22* (2013.01)

(56) References Cited

FOREIGN PATENT DOCUMENTS

| | | |
|---|---|---|
| CN | 108795481 A | 11/2018 |
| CN | 109381892 A | 2/2019 |

* cited by examiner

SHORT-PROCESS SEPARATION SYSTEM FOR SEPARATING IONIC LIQUID FROM ALKYLATION REACTION EFFLUENT

CROSS-REFERENCE TO RELATED APPLICATION

The present application claims priority to Chinese Patent Application No. 201910531603.7 filed on Jun. 19, 2019, the entire contents of which are hereby incorporated by reference into this application.

TECHNICAL FIELD

The present disclosure relates to a short-process separation system for separating ionic liquid from alkylation reaction effluent, particularly to a short-process separation system for purification and separation of alkylation reaction effluent using multiple stages of coalescence separators and a low-temperature fine coalescence separator. The present disclosure pertains to the petrochemical field.

BACKGROUND ART

Along with rapid increase in the number of motor vehicles in cities, motor vehicle exhaust emission becomes the main source of atmospheric environmental pollution. Under the related environmental protection requirements, the government sets forth a policy for upgrading the vehicle fuel standard. The upgrade of the motor vehicle standard promotes great increase in the demand of high-octane gasoline components. Alkylated gasoline is a mixture of isoparaffins, and excels catalytic gasoline and reformed gasoline in low sulfur, nitrogen, aromatic hydrocarbons and olefins; low volatility; a low vapor pressure; a high-octane number; etc. It is an ideal clean gasoline component. Therefore, the novel C4 alkylation process technology had become a key aspect of the research of a good number of scientists.

Currently, based on the type of the catalyst, the process technology is classified into liquid acid alkylation process and solid acid alkylation process. Although solid acid has the characteristic of environmentally friendliness, it is prone to coking and deactivation, and thus needs frequent regeneration. As a result, its industrial application is limited. Liquid acid alkylation processes include hydrofluoric acid alkylation, sulfuric acid alkylation and ionic liquid alkylation. With respect to the hydrofluoric acid alkylation and sulfuric acid alkylation, as traditional industrial catalysts, hydrofluoric acid and concentrated sulfuric acid have strong corrosivity that causes potential safety risk to equipments and operators, and a large quantity of waste acid residues are generated as byproducts. In the prior art, a waste acid regeneration device is generally selected for recycling this type of solid wastes. However, this device is used under very harsh conditions with high energy consumption and equipment investment. Furthermore, it emits gaseous pollutants ($SO_2$, $NO_x$), and has poor economic and environmental benefits.

As a novel compound system, ionic liquid has the characteristics of a wide range of liquid state temperature; a low vapor pressure, low volatility, incombustibility, non-oxidation and good stability; a wide dissolution range with a relatively high solubility; adjustable acidity and the like. In addition, the ionic liquid has better characteristics than the traditional catalysts in various aspects such as product quality and yield, ionic liquid utilization efficiency, operation safety, environmental friendliness, operation convenience and the like. However, in the ionic liquid alkylation process, in order to obtain cleaner alkylated oil, it has become an industrial challenge to thoroughly separate the ionic liquid in the alkylation reactant to reduce the loss of the ionic liquid and remove the subsequent alkaline washing and water washing processes.

FIG. 1 shows a process flow chart for separating ionic liquid in a prior art of ionic liquid alkylation reactant. As shown by FIG. 1, after reaction in an alkylation reactor, the alkylation reaction effluent is fed into a primary cyclone splitter+a gravity settling tank for primary cyclone separation and settling. After the gravity settling, the ionic liquid is returned to the alkylation reactor or discharged. The supernatant after the settling and the alkylation reaction effluent obtained by the cyclone separation at an overflow port are fed into a secondary cyclone splitter+a gravity settling tank for secondary cyclone separation and settling. After the gravity settling, the ionic liquid is returned to the alkylation reactor or discharged. The supernatant after the settling and the alkylation reaction effluent obtained by cyclone separation at an overflow port are fed into a gravity settling tank for gravity settling again. The ionic liquid at the bottom of the gravity settling tank is returned to the alkylation reactor or discharged. The upper clean alkylation reaction effluent is sent to a flash tank for flash evaporation, and then enters an alkaline washing tower for alkaline washing, wherein the used alkaline water is discharged, and the alkylation reaction effluent after the alkaline washing is sent to a water washing tower for water washing with process water, wherein the used waste water is discharged. The water washed product is sent to a drying system, and finally to a fractionating tower for fractional distillation.

In the prior art, the ionic liquid phase and the alkane oil phase in the alkylation reaction product are separated by way of cyclone+gravity settling. This way has the defects of a large ionic liquid inventory in the separation system, a low separation precision, a large equipment investment, a high operation cost, and a large amount of waste water generated in subsequent alkaline washing and water washing processes which pollutes the environment.

Therefore, it is a great challenge in the petrochemical field to recycle the ionic liquid in a way that really realizes its recycling, and further promotes popularization and application of the clean process.

SUMMARY

To solve the problems existing in the prior art, the present disclosure provides a short-process system for separating ionic liquid from alkylation reaction effluent. In light of the compositional characteristics of the alkylation reaction effluent, the original treatment process is improved. The designed treatment process (multiple stages of coalescence separators and a low-temperature fine coalescence separator are utilized to purify and separate the reaction effluent in an alkylation process using the ionic liquid as a catalyst) effectively solves the problem of difficult recovery of the ionic liquid, exempts the production steps of alkaline washing, water washing, drying and the like, and realizes zero discharge of waste water and other pollutants.

The present disclosure is realized by the following technical solution:

A short-process separation system for separating ionic liquid from alkylation reaction effluent, wherein the separation system comprises an alkylation reactor, an ionic liquid storage tank, a primary coalescence separator, a secondary coalescence separator, a flash tank, a low-temperature fine coalescence separator, and a fractionating tower; wherein the alkylation reactor comprises at least one feed port, an effluent discharge port and an ionic liquid return port;

the ionic liquid storage tank comprises an inlet in communication with bottom flow ports of the primary coalescence separator, the secondary coalescence separator and the low-temperature fine coalescence separator through delivery lines, and an outlet in communication with the return port of the alkylation reactor through a delivery pump;

each of the primary coalescence separator, the secondary coalescence separator and the low-temperature fine coalescence separator comprises a liquid feed port, a bottom flow port and a top flow port, wherein the liquid feed port of the primary coalescence separator communicates with the effluent discharge port of the alkylation reactor through a delivery line; the top flow port of the primary coalescence separator communicates with the liquid feed port of the secondary coalescence separator through a delivery line; the top flow port of the secondary coalescence separator communicates with an inlet of the flash tank through a delivery line; the liquid feed port of the low-temperature fine coalescence separator communicates with an outlet of the flash tank through a delivery line; and the top flow port of the low-temperature fine coalescence separator communicates with a feed port of the fractionating tower through a delivery line; and the fractionating tower comprises at least one fractionating tower feed port and a plurality of fraction product discharge ports, wherein fraction products communicate with a plurality of product storage tanks through respective lines.

Further, multiple stages of coalescence separators may be arranged between the alkylation reactor and the flash tank; and at least one set of static mixers are further arranged between the alkylation reactor and the primary coalescence separator.

Further, the primary coalescence separator is vertical, and is connected in parallel with at least one identical coalescence separator, wherein an antiscour rectifier is arranged at the liquid feed port of the primary coalescence separator, an inclined plate blade is arranged at the middle, and a primary coalescence internal member is arranged at the top, wherein the primary coalescence internal member is a composite internal member comprising a first half section of a fiber lacking affinity with the ionic liquid (non-wettable drainage layer) and a second half section of a fiber having affinity with the ionic liquid (wettable coalescing layer).

Further, the secondary coalescence separator is horizontal, wherein a corrugated plate is arranged at a front end thereof, and a secondary coalescence internal member is arranged at a back end thereof, wherein the secondary coalescence internal member comprises two sections, wherein the first section and the second section of the coalescence internal member both utilize a fiber having affinity with the ionic liquid, wherein the secondary coalescence internal member has a porosity descending from 90% to 70% at a gradient of 10%.

Further, the low-temperature fine coalescence separator comprises a low-temperature fine coalescence internal member, wherein the low-temperature fine coalescence internal member utilizes a fiber having affinity with the ionic liquid, and the low-temperature fine coalescence internal member has a porosity descending from 80% to 70% at a gradient of 5%.

Further, in the primary coalescence separator, the fiber lacking affinity with the ionic liquid utilizes a polypropylene fiber or a polytetrafluoroethylene fiber and the fiber having affinity with the ionic liquid utilizes a stainless steel fiber, a glass fiber or a modified hydrophilic fiber; in the secondary coalescence separator and the low-temperature fine coalescence separator, the fiber having affinity with the ionic liquid utilizes a stainless steel fiber, a glass fiber or a modified hydrophilic fiber.

Beneficial Effects:

The short-process separation system for separating ionic liquid from alkylation reaction effluent according to the present disclosure differs from the prior art in change of a "cyclone-gravity settling" mode into a "multiple stages of coalescence separation+low-temperature fine coalescence separation" mode which has a much higher separation precision, can solve the problems of unthorough separation, environmental pollution and the like, and eliminates alkaline washing, water washing and drying processes, so as to reduce investment and save energy.

The whole treatment process according to the present disclosure is close to a closed-loop operation. The treatment of the ionic liquid in the alkylated oil is more thorough, and the ionic liquid is recycled. Discharge of waste liquid and other pollutants is basically avoided, so that the ionic liquid alkylation process is more environmentally friendly, and the industrialized popularization of the cleaner catalytic process is facilitated.

DETAILED DESCRIPTION

The present disclosure will be further illustrated with reference to the accompanying drawings and specific embodiments and examples.

Figure 1:
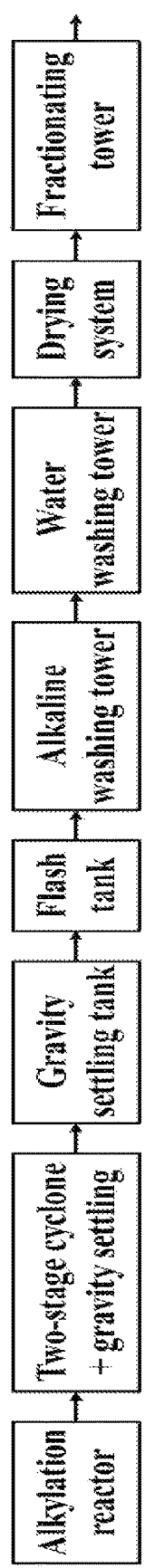
FIG. 1 is a schematic view showing separation of the ionic liquid in ionic liquid alkylation reactant according to the prior art.
Figure 2:
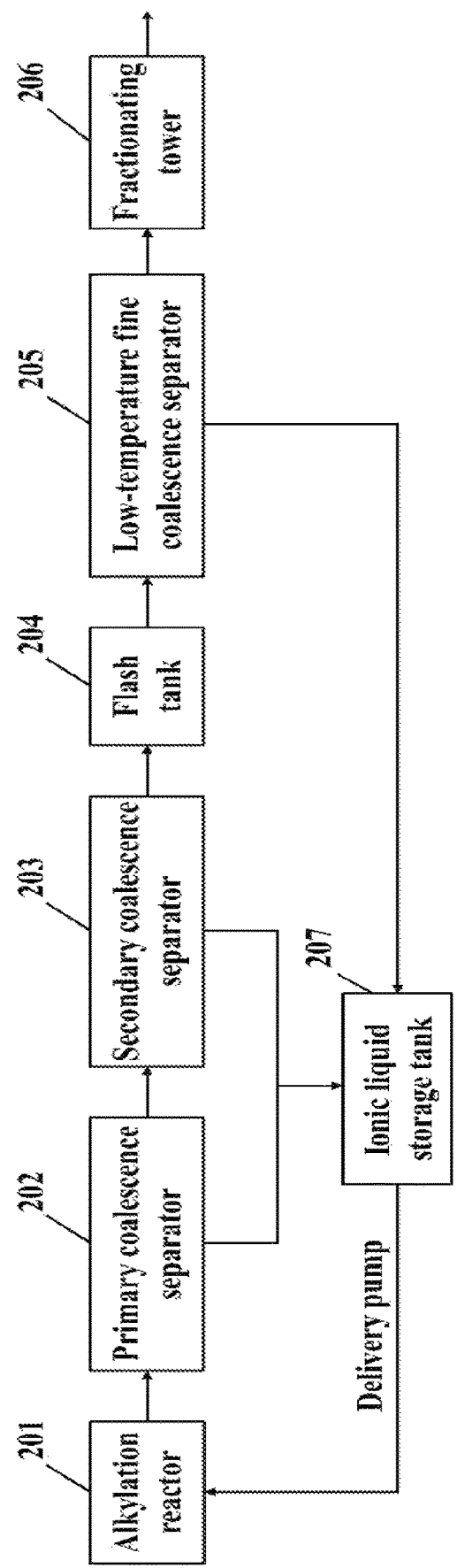
FIG. 2 is a schematic view showing a short-process separation system for separating ionic liquid from alkylation reaction effluent designed according to the present disclosure.
Figure 3:
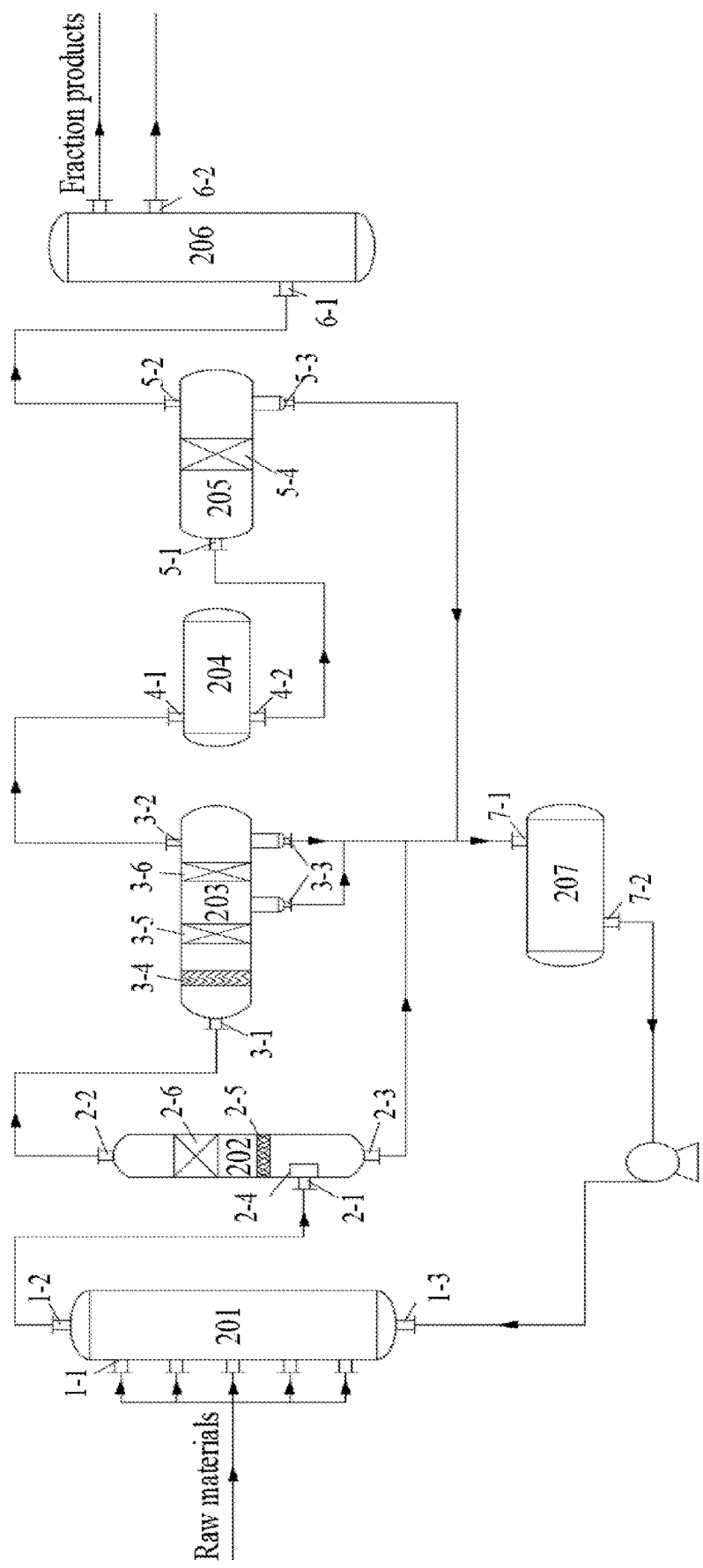
FIG. 3 is a schematic view showing a short-process separation system, a process flow and corresponding devices for separating ionic liquid from alkylation reaction effluent designed according to the present disclosure, in which 1-1, 1-2 and 1-3 represent the feed port, discharge port and return port of the alkylation reactor respectively; 2-1, 2-2 and 2-3 represent the liquid feed port, top flow port and bottom flow port of the primary coalescence separator respectively; 2-4, 2-5 and 2-6 represent the antiscour rectifier, inclined plate blade and primary coalescence internal member of the primary coalescence separator; 3-1, 3-2 and 3-3 represent the liquid feed port, top flow port and bottom flow port of the secondary coalescence separator respectively; 3-4, 3-5 and 3-6 represent the corrugated plate, the first section of coalescence internal member and the second section of coalescence internal member of the secondary coalescence separator; 4-1 and 4-2 represent the feed port and outlet of the flash tank respectively; 5-1, 5-2 and 5-3 represent the liquid feed port, top flow port and bottom flow port of the low-temperature fine coalescence separator respectively; 5-4 represents the low-temperature fine coalescence internal member of the low-temperature fine coalescence separator; 6-1 and 6-2 represent the feed port and discharge port of the facilitating tower respectively; and 7-1 and 7-2 represent the inlet and outlet of the ionic liquid storage tank respectively.
Figure 4C:
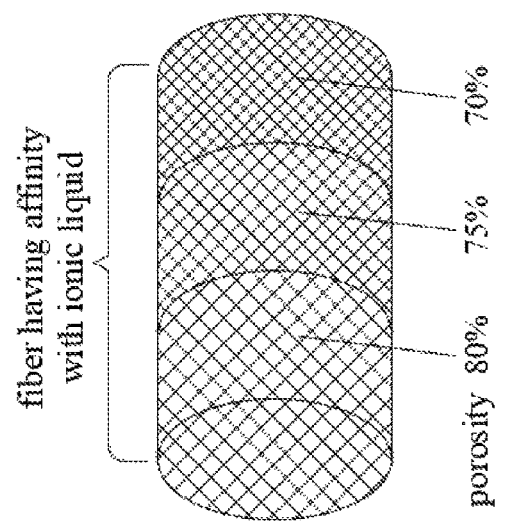
FIG. 4(c) is a schematic view of a coalescence internal member of a low-temperature fine coalescence separator.
Figure 4B:
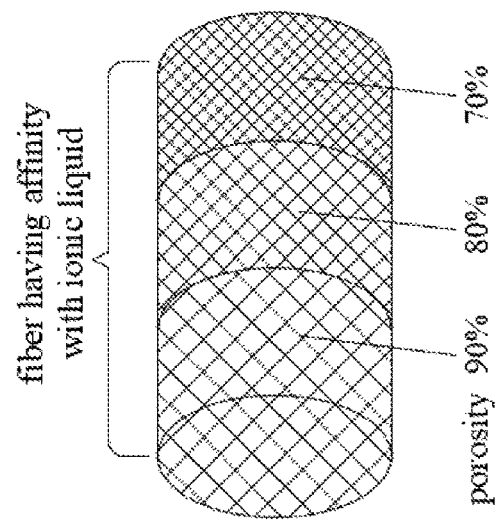
FIG. 4(b) is a schematic view of each section coalescence internal member of a secondary coalescence separator.
Figure 4A:
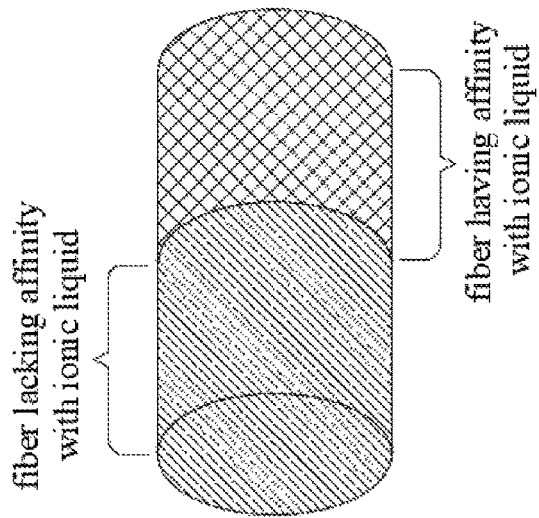
FIG. 4(a) is a schematic view of a coalescence internal member of a primary coalescence separator.

With reference to FIG. 2, the present disclosure provides a short-process separation system for separating ionic liquid from alkylation reaction effluent, comprising: an alkylation reactor 201, a primary coalescence separator 202, a secondary coalescence separator 203, a flash tank 204, a low-temperature fine coalescence separator 205, a fractionating tower 206 and an ionic liquid storage tank 207. In this example, first of all, raw materials such as liquid iso-butane, butene and the like needs to be dewatered by passing through a molecular sieve or otherwise drying. After the moisture is lower than 20 ppm, the raw material is fed into the alkylation reactor 201 where it undergoes alkylation reaction with the ionic liquid. After complete reaction, the reaction mixture is sent to the main processes for treatment.

The alkylation reactor 201 comprises at least one feed port 1-1, an effluent discharge port 1-2 and an ionic liquid return port 1-3.

The ionic liquid storage tank 207 comprises an inlet 7-1 in communication with bottom flow ports 2-3, 3-3, 5-3 of the primary coalescence separator 202, the secondary coalescence separator 203 and the low-temperature fine coalescence separator 205 through a delivery line, and an outlet 7-2 in communication with the return port 1-3 of the alkylation reactor 201 through a delivery pump.

Each of the primary coalescence separator 202, the secondary coalescence separator 203 and the low-temperature fine coalescence separator 205 comprises a liquid feed port, a bottom flow port and a top flow port; the liquid feed port 2-1 of the primary coalescence separator 202 communicates with the discharge port 1-2 of the alkylation reactor 201 through a delivery line; the top flow port 2-2 of the primary coalescence separator 202 communicates with the liquid feed port 3-1 of the secondary coalescence separator 203 through a delivery line; the top flow port 3-2 of the secondary coalescence separator 203 communicates with the inlet 4-1 of the flash tank 204 through a delivery line; the liquid feed port 5-1 of the low-temperature fine coalescence separator 205 communicates with the outlet 4-2 of the flash tank 204 through a delivery line; and the top flow port 5-2 of the low-temperature fine coalescence separator 205 communicates with the feed port 6-1 of the fractionating tower 206 through a delivery line.

The fractionating tower 206 comprises at least one feed port 6-1 and a plurality of fraction product discharge ports 6-2, wherein fraction products communicate with a plurality of product storage tanks through respective lines.

The coalescence internal members may utilize fibers lacking affinity with the ionic liquid, such as polypropylene fiber, polytetrafluoroethylene fiber and the like, and fibers having affinity with the ionic liquid, such as stainless steel fiber, glass fiber, modified hydrophilic fiber and the like, so as to modify the wettability between the fibers and the ionic liquid, and thus facilitate penetration of solid impurities through the internal members. At the same time, gradient porosity is controlled actively to enhance the anti-clogging capability.

In view of the harsh physical and chemical properties of the ionic liquid, the reactor, primary coalescence separator, secondary coalescence separator, flash tank, low-temperature fine coalescence separator and fractionating tower as well as the connecting lines are all made of carbon steel, and carbon steel can be treated with glass fiber reinforced plastics to be subjected to anti-corrosion.

The short-process separation system of the present disclosure separates the ionic liquid in the ionic liquid alkylation reactant according to the following process:

(1) dried materials having a moisture of less than 20 ppm such as liquid iso-butane, butene and the like are fed into an alkylation reactor to undergo alkylation reaction with the ionic liquid, and after complete reaction, sent to the main processes for separation;

(2) the effluent of the ionic liquid alkylation reaction is delivered into a primary vertical coalescence separator to coalesce and separate more than 98% of the ionic liquid in the effluent of the alkylation reaction, thereby providing an alkylation reaction effluent having an ionic liquid content of 20-30 mg/kg;

(3) the alkylation reaction effluent having an ionic liquid content of 20-30 mg/kg obtained in Step (2) is delivered into a secondary coalescence separator to coalesce and separate the remaining ionic liquid, thereby providing an alkylation reaction effluent having an ionic liquid content of 5-8 mg/kg;

(4) the alkylation reaction effluent having an ionic liquid content of 5-8 mg/kg obtained in Step (3) passes through a flash tank, and is delivered into a low-temperature fine coalescence separator to finely coalesce and separate the trace amount of residual ionic liquid, thereby providing an alkylation reaction effluent having an ionic liquid content of less than 5 mg/kg;

(5) the alkylation reaction effluent having an ionic liquid content of less than 5 mg/kg obtained in Step (4) is finally delivered into a fractionating tower to fractionate the other components.

Example 1

Taking an ionic liquid catalytic alkylation apparatus with an annual output of 100 thousand tons as an example, a composite ionic liquid was used to catalyze C4 to produce a high-octane number alkylated oil. About 4.5-6 kg ionic liquid byproduct per ton of alkylated oil was generated by the apparatus, wherein the ionic liquid byproduct was mainly consisting of the composite ionic liquid. Put another way, after the reaction in the alkylation reactor, the ionic liquid content in the reactants was 4500-6000 mg/kg.

The short-process separation system of the present disclosure separated the ionic liquid from the ionic liquid alkylation reaction effluent according to the following working process:

Dried raw materials such as liquid iso-butane, butene and the like were fed into an alkylation reactor 201 to undergo alkylation reaction and afford an alkylation reaction effluent comprising a product generated by the alkylation reaction (i.e. alkylated oil), ionic liquid that hadn't participated in the alkylation reaction (the ionic liquid in short) and some solid impurities. Then, the alkylation product comprising the alkylated oil and the ionic liquid was delivered into a primary coalescence separator 202 for coalescence and separation. In the primary coalescence separator 202, coalescence and separation occurred first on an inclined plate blade at the lower part, and then fine separation occurred on a coalescence filler at the upper part. An alkylation product having an ionic liquid content of 20-30 mg/kg was obtained. After the coalescence and separation, as a heavy phase, the ionic liquid settled to the bottom of the primary coalescence separator 202. After enrichment, it was delivered into an ionic liquid storage tank 207. The alkylation product having an ionic liquid content of 20-30 mg/kg was delivered from a top flow port of the primary coalescence separator 202 into a secondary coalescence separator 203, wherein coalescence and separation occurred first on a corrugated plate arranged at the front end, and then the trace amount of ionic liquid was coalesced and separated on a coalescence internal member arranged at the back end. An alkylation product having an ionic liquid content of 5-8 mg/kg was obtained. The isolated ionic liquid settled to the bottom of the secondary coalescence separator 203. After enrichment, it was delivered into the ionic liquid storage tank 207. The ionic liquid in the ionic liquid storage tank 207 was pumped into the alkylation reactor 201 for cyclic treatment. The alkylation product having an ionic liquid content of 5-8 mg/kg was delivered from a top flow port of the secondary coalescence separator 203 into a flash tank 204 for flash evaporation. After the flash evaporation, the alkylation product was delivered into a low-temperature fine coalescence separator 205 for low-temperature fine coalescence and separation. In the low-temperature fine coalescence separator 205, the alkylation product was first cooled at a low temperature to 5° C. or less, and then subjected to fine separation on a coalescence filler inside the low-temperature fine coalescence separator 205, resulting in an alkylation product having an ionic liquid content of less than 5 mg/kg. Finally, the alkylation product having an ionic liquid content of less than 5 mg/kg was delivered into a fractionating tower 205 to fractionate the other components.

The ionic liquid tended to solidify and release heat when exposed to water. The solidification led to formation of dangerous solid waste which was entrained in the viscous ionic liquid and might clog apparatus easily. Hence, as a measure to eliminate this kind of solid waste in the present disclosure, the moisture in the raw materials such as liquid iso-butane, butene and the like was reduced at first.

In this Example, the moisture was removed from the materials such as liquid iso-butane, butene and the like by using a molecular sieve or by drying. After the moisture became less than 20 ppm, the materials were fed into the alkylation reactor for alkylation reaction with the ionic liquid. After complete reaction, the reaction mixture was sent to the main processes for separation. On the other hand, in order to prevent clogging of the separators, the primary coalescence separator in the separation system of the present disclosure is vertical, and connected in parallel with another identical coalescence separator. When one coalescence separator was clogged, the separation continued in the other coalescence separator that was connected in parallel.

In the primary coalescence separation process, the retention time of the fluid in the primary coalescence separator was not less than 30 minutes; the flow rate of the fluid flowing through the primary coalescence separator was not higher than 0.02 m/s; the operating pressure was not higher than 30 kPa; and the internal pressure was stabilized at 0.5-1.5 MPa.

In the secondary coalescence separation process, the retention time of the fluid in the secondary coalescence separator was not less than 1 hour; the flow rate of the fluid flowing through the secondary coalescence separator was not higher than 0.01 m/s; the operating pressure was not higher than 20 kPa; and the internal pressure was stabilized at 0.2-1.0 MPa.

In the low-temperature fine coalescence separation process, the retention time of the fluid in the low-temperature fine coalescence separator was not less than 1.5 hour; the flow rate of the fluid flowing through the low-temperature fine coalescence separator was not higher than 0.005 m/s; the operating pressure was not higher than 10 kPa; the internal pressure was stabilized at 0.2-1.0 MPa; and an alkylation reaction effluent having an ionic liquid content of less than 5 mg/kg was obtained.

In the coalescence separation processes, the difference of the ionic liquid and the alkane oil in their affinity with a coalescing material surface was utilized. Small ionic liquid droplets were inclined to converge and combine at the surface of a coalescing material having affinity with the ionic liquid. When the ionic liquid droplets grew to a certain size, they would leave the surface of the coalescing material under the action of gravity and the flow field, and form large droplets which would settle downstream, thereby achieving rapid separation of the ionic liquid and the alkane oil. In the low-temperature fine coalescence separation process, at a low temperature, the viscosity of the ionic liquid became larger, and the degree of saturation of the ionic liquid in the hydrocarbon became smaller. Hence, very small ionic liquid droplets were more inclined to converge and combine at the surface of the coalescing material having an affinity with the ionic liquid, such that the separation precision was higher.

In the above coalescence separation process, the separation efficiency might be increased by adding an inclined plate blade and a corrugated plate into the separators, changing the material of the fiber filler and reducing the product temperature. Specifically, an inclined plate blade was arranged at the lower part of the primary coalescence separator to remove large-particle ionic liquid droplets having a particle size of more than 35 μm, and enhance collision and adhesion of small-particle ionic liquid droplets in the hydrocarbon phase on the inclined plate blade, so as to increase the diameter of the droplets. A corrugated plate was arranged at the front end of the secondary coalescence separator to reinforce separation and increase the collision and coalescence probability of the liquid droplets. The primary coalescence internal member utilized a combination of a fiber material lacking affinity with the ionic liquid, such as polypropylene fiber, polytetrafluoroethylene fiber and the like, and a fiber material having affinity with the ionic liquid, such as stainless steel fiber, glass fiber, modified hydrophilic fiber and the like. The secondary coalescence internal member and the low-temperature fine coalescence internal member utilized a fiber material having affinity with the ionic liquid, such as stainless steel fiber, glass fiber, and the like or a modified fiber having affinity with the ionic liquid. In the low-temperature fine separator, the fluid was cooled to below 5° C. to increase the viscosity of the ionic liquid and reduce the degree of saturation, so as to improve the separation precision.

As indicated by the above Example, by employing the short-process separation system for separating ionic liquid from alkylation reaction effluent according to the present disclosure, the whole treatment process is close to a closed-loop operation, wherein the product is an alkylated oil having a very high degree of cleanliness with substantially zero discharge of waste liquid and other pollutants. The treated alkylation product comprises an extremely low content of ionic liquid. The alkaline washing tower, water washing tower and drying system that are needed in a prior art process are obviated. Hence, the process of the present disclosure is a green process that satisfies the requirements of environmental protection.

The system and process of the present disclosure enables recycling of the catalyst, elimination of such production procedures as alkaline washing, water washing, drying and the like, and zero discharge of waste water and other pollutants, and thus has very superior industrial applicability and economical efficiency.

What is claimed is:

1. A short-process separation system for separating ionic liquid from alkylation reaction effluent, wherein the separation system comprises an alkylation reactor, an ionic liquid storage tank, a primary coalescence separator, a secondary coalescence separator, a flash tank, a low-temperature fine coalescence separator, and a fractionating tower, wherein:
the alkylation reactor comprises at least one feed port, an effluent discharge port and an ionic liquid return port;
the ionic liquid storage tank comprises an inlet in communication with bottom flow ports of the primary coalescence separator, the secondary coalescence separator and the low-temperature fine coalescence separator through delivery lines, and an outlet in communication with the return port of the alkylation reactor through a delivery pump;
each of the primary coalescence separator, the secondary coalescence separator and the low-temperature fine coalescence separator comprises a liquid feed port, a bottom flow port and a top flow port, wherein the liquid feed port of the primary coalescence separator communicates with the effluent discharge port of the alkylation reactor through a delivery line; the top flow port of the primary coalescence separator communicates with the liquid feed port of the secondary coalescence separator through a delivery line; the top flow port of the secondary coalescence separator communicates with an inlet of the flash tank through a delivery line; the liquid feed port of the low-temperature fine coalescence separator communicates with an outlet of the flash tank through a delivery line; and the top flow port of the low-temperature fine coalescence separator communicates with a feed port of the fractionating tower through a delivery line; and
the fractionating tower comprises at least one fractionating tower feed port and a plurality of fraction product discharge ports, wherein fraction products communicate with a plurality of product storage tanks through respective lines.

2. The short-process separation system for separating ionic liquid from alkylation reaction effluent according to claim 1, wherein multiple stages of coalescence separators are arranged between the alkylation reactor and the flash tank; and at least one set of static mixers are further arranged between the alkylation reactor and the primary coalescence separator.

3. The short-process separation system for separating ionic liquid from alkylation reaction effluent according to claim 1, wherein the primary coalescence separator is vertical, and is connected in parallel with at least one identical coalescence separator, wherein an antiscour rectifier is arranged at the liquid feed port of the primary coalescence separator, an inclined plate blade is arranged at the middle, and a primary coalescence internal member is arranged at the top.

4. The short-process separation system for separating ionic liquid from alkylation reaction effluent according to claim 3, wherein the primary coalescence internal member is a composite internal member comprising a first half section of a fiber lacking affinity with the ionic liquid (non-wettable drainage layer) and a second half section of a fiber having affinity with the ionic liquid (wettable coalescing layer).

5. The short-process separation system for separating ionic liquid from alkylation reaction effluent according to claim 4, wherein in the primary coalescence separator, the fiber lacking affinity with the ionic liquid comprises a polypropylene fiber or a polytetrafluoroethylene fiber and the fiber having affinity with the ionic liquid comprises a stainless steel fiber, a glass fiber or a modified hydrophilic fiber.

6. The short-process separation system for separating ionic liquid from alkylation reaction effluent according to claim 1, wherein the secondary coalescence separator is horizontal, wherein a corrugated plate is arranged at a front end thereof, and a secondary coalescence internal member is arranged at a back end thereof, wherein the secondary coalescence internal member comprises two sections, wherein a first section and a second section of the coalescence internal member both utilize a fiber having affinity with the ionic liquid, wherein the secondary coalescence internal member has a porosity descending from 90% to 70% at a gradient of 10%.

7. The short-process separation system for separating ionic liquid from alkylation reaction effluent according to claim 6, wherein in the secondary coalescence separator, the fiber having affinity with the ionic liquid comprises a stainless steel fiber, a glass fiber, or a modified hydrophilic fiber.

8. The short-process separation system for separating ionic liquid from alkylation reaction effluent according to claim 1, wherein the low-temperature fine coalescence separator comprises a low-temperature fine coalescence internal member, wherein the low-temperature fine coalescence internal member utilizes a fiber having affinity with the ionic liquid, and the low-temperature fine coalescence internal member has a porosity descending from 80% to 70% at a gradient of 5%.

9. The short-process separation system for separating ionic liquid from alkylation reaction effluent according to claim 8, wherein in the low-temperature fine coalescence separator, the fiber having affinity with the ionic liquid comprises a stainless steel fiber, a glass fiber, or a modified hydrophilic fiber.

10. The short-process separation system for separating ionic liquid from alkylation reaction effluent according to claim 2, wherein the primary coalescence separator is vertical, and is connected in parallel with at least one identical coalescence separator, wherein an antiscour rectifier is arranged at the liquid feed port of the primary coalescence separator, an inclined plate blade is arranged at the middle, and a primary coalescence internal member is arranged at the top.

11. The short-process separation system for separating ionic liquid from alkylation reaction effluent according to claim 10, wherein the primary coalescence internal member is a composite internal member comprising a first half section of a fiber lacking affinity with the ionic liquid (non-wettable drainage layer) and a second half section of a fiber having affinity with the ionic liquid (wettable coalescing layer).

12. The short-process separation system for separating ionic liquid from alkylation reaction effluent according to claim 11, wherein in the primary coalescence separator, the fiber lacking affinity with the ionic liquid comprises a polypropylene fiber or a polytetrafluoroethylene fiber and the fiber having affinity with the ionic liquid comprises a stainless steel fiber, a glass fiber, or a modified hydrophilic fiber.

13. The short-process separation system for separating ionic liquid from alkylation reaction effluent according to claim 2, wherein the secondary coalescence separator is horizontal, wherein a corrugated plate is arranged at a front end thereof, and a secondary coalescence internal member is arranged at a back end thereof, wherein the secondary coalescence internal member comprises two sections, wherein a first section and a second section of the coalescence internal member both utilize a fiber having affinity with the ionic liquid, wherein the secondary coalescence internal member has a porosity descending from 90% to 70% at a gradient of 10%.

14. The short-process separation system for separating ionic liquid from alkylation reaction effluent according to claim 13, wherein in the secondary coalescence separator, the fiber having affinity with the ionic liquid comprises a stainless steel fiber, a glass fiber, or a modified hydrophilic fiber.

15. The short-process separation system for separating ionic liquid from alkylation reaction effluent according to claim 2, wherein the low-temperature fine coalescence separator comprises a low-temperature fine coalescence internal member, wherein the low-temperature fine coalescence internal member utilizes a fiber having affinity with the ionic liquid, and the low-temperature fine coalescence internal member has a porosity descending from 80% to 70% at a gradient of 5%.

16. The short-process separation system for separating ionic liquid from alkylation reaction effluent according to claim 15, wherein in the low-temperature fine coalescence separator, the fiber having affinity with the ionic liquid comprises a stainless steel fiber, a glass fiber, or a modified hydrophilic fiber.

* * * * *